United States Patent
Carrender et al.

(10) Patent No.: US 11,328,196 B2
(45) Date of Patent: May 10, 2022

(54) DUAL MODE RFID TAG SYSTEM

(71) Applicant: Thinkify, LLC, Morgan Hill, CA (US)

(72) Inventors: Curtis L. Carrender, Morgan Hill, CA (US); Peter Soule, Pacific Grove, CA (US)

(73) Assignee: Thinkify, LLC, Morgan Hill, CA (US)

( * ) Notice: Subject to any disclaimer, the term of this patent is extended or adjusted under 35 U.S.C. 154(b) by 188 days.

(21) Appl. No.: 16/812,042

(22) Filed: Mar. 6, 2020

(65) Prior Publication Data

US 2020/0285928 A1 Sep. 10, 2020

Related U.S. Application Data

(60) Provisional application No. 62/814,636, filed on Mar. 6, 2019.

(51) Int. Cl.
| | |
|---|---|
| *H04B 7/00* | (2006.01) |
| *G06K 19/07* | (2006.01) |
| *H04W 4/40* | (2018.01) |
| *H01Q 1/22* | (2006.01) |
| *H04W 4/80* | (2018.01) |

(52) U.S. Cl.
CPC ....... *G06K 19/0725* (2013.01); *H01Q 1/2225* (2013.01); *H04W 4/40* (2018.02); *H04W 4/80* (2018.02)

(58) Field of Classification Search
CPC ...... G06K 19/0725; H04W 4/80; H04W 4/40; H01Q 1/2225
USPC .......................................................... 455/41.2
See application file for complete search history.

(56) References Cited

U.S. PATENT DOCUMENTS

| | | | | |
|---|---|---|---|---|
| RE45,980 E | * | 4/2016 | Ohnishi | G08C 17/00 |
| 2006/0202032 A1 | * | 9/2006 | Kricorissian | G06K 7/0004 |
| | | | | 235/435 |
| 2008/0223925 A1 | * | 9/2008 | Saito | G06Q 20/341 |
| | | | | 235/380 |
| 2008/0319905 A1 | * | 12/2008 | Carlson | G06Q 40/02 |
| | | | | 705/44 |
| 2009/0009295 A1 | * | 1/2009 | Rofougaran | H04B 5/0012 |
| | | | | 340/10.1 |
| 2011/0156869 A1 | * | 6/2011 | Watt | G06K 7/1447 |
| | | | | 340/10.1 |

(Continued)

*Primary Examiner* — April G Gonzales
(74) *Attorney, Agent, or Firm* — Seed Intellectual Property Law Group LLP (57) ABSTRACT

A dual-mode RFID tag and related system for storing, monitoring, and recovering data regarding an object, the system including a dual mode tag including a case, a UHF tag inside the case and structured to store at least a first portion data about the object, and an HF tag inside the case and to store at least a second portion of data about the object; the system further including a UHF reader to communicate with the UHF tag, an HF reader on a personal device to communicate with the HF tag, and a remote management system having a memory and a communication system that is communicatively coupleable to one or both of the HF reader and the UHF reader to receive a communication signal from one or both of the HF reader and the UHF tag and to store and modify data about the object in the remote management system, and to transmit data about the object to one or both of the UHF tag and the HF tag after determining the authorization of the HF reader user.

8 Claims, 3 Drawing Sheets

(56) References Cited

U.S. PATENT DOCUMENTS

| | | | | |
|---|---|---|---|---|
| 2012/0019363 A1* | 1/2012 | Fein | ............... | G06K 19/07767 |
| | | | | 340/10.1 |
| 2012/0019674 A1* | 1/2012 | Ohnishi | ............... | G08C 17/00 |
| | | | | 348/207.1 |
| 2013/0241701 A1* | 9/2013 | Almond | ............ | G06K 7/10198 |
| | | | | 340/10.1 |
| 2013/0247117 A1* | 9/2013 | Yamada | ............... | G08C 17/02 |
| | | | | 725/93 |
| 2013/0264390 A1* | 10/2013 | Frey | ..................... | H01Q 7/00 |
| | | | | 235/492 |
| 2020/0082722 A1* | 3/2020 | Beiski | ............... | G06K 19/0723 |

* cited by examiner

DUAL MODE RFID TAG SYSTEM

BACKGROUND

Technical Field

The present disclosure pertains to monitoring of objects using radio frequency identification techniques and, more particularly, to a radio frequency identification transponder or tag having two operational modes that enable interrogation of a tag in a first mode or a second mode to recover information stored on the tag and to transmit the recovered information locally or through the Internet to monitor the status, location, movement, and use of the object to authorized users.

Description of the Related Art

Radio Frequency Identification (RFID) technology operating at Ultra-High Frequencies (UHF) is now fairly well known. A typical RFID system includes a remote transponder or "tag" and a local interrogator or "reader." The reader transmits an interrogation signal to the tag, which is received by the tag, modulated, and returned by backscatter reflection to the reader. The reader receives the modulated backscattered signal and extracts data, such as information about the tag or an object to which the tag is associated, or about the location of the tag.

More particularly, modern UHF RFID tags are constructed by forming an antenna on a single RFID Application Specific Integrated Circuit (ASIC). The tag harvests energy from the electric field generated by the reader. The tag then modulates the match it has to the antenna, based upon a code in the ASIC, resulting in a change in phase and or amplitude of the energy reflected to the reader antenna.

In the context of transporting cargo and people, the history of beam RFID at UHF can be traced directly to those tags approved for the American Association of Railroads (AAR). These tags replaced the older barcode approach on rail stock and have been in use for 30 years now. A beam powered UHF RFID system used in rail applications gathers the energy from the incident radio waves' power and begins at some point to reflect selectively, depending upon the contents of its' memory, the ID of the associated wagon or locomotive to which it is attached. Thousands of readers for these tags and millions of the tags themselves have been utilized all over the world in this context alone.

One shortcoming of the UHF technology is that these UHF readers are fairly expensive. A track-side RFID system can easily cost over $10,000 when all portions of the reader are accounted for. Handheld longer range readers are available, but none are less than $500 at the present time.

BRIEF SUMMARY

The present disclosure provides dual mode tags that include a "Near-Field" device, such as a High Frequency (HF) device, implementation of a UHF tag. Such tags are more commonly used for interrogation by a cell phone that is equipped with a "Near-Field" receiver, such as a 13.56 MHz reader. In comparison to UHF readers, HF readers are fairly inexpensive. Most newer cell phones incorporate an HF reader for the purpose of commerce, such as "Tap-to-Pay" applications.

In accordance with one aspect of the present disclosure, a dual mode beam powered RFID tag physically associated with a vehicle or rail car is provided, the dual mode RFID tag structured for use with an HF reader. The dual mode beam powered RFID tag includes a case, a UHF tag stored inside the case, the UHF tag structured to store first information about the rail car or vehicle, and an HF tag stored inside the case, the HF tag structured to store second information about the UHF tag data, wherein the HF tag is not communicatively coupled to the UHF tag. The HF tag is structured to store data that is encrypted to require the HF reader user to contact another database to decode that information, and only after the other database determines the authorization of the HF reader user.

In accordance with another aspect of the present disclosure, a system to enable storing, monitoring, modifying, and recovering data regarding an object is provided. The system includes a beam powered dual mode tag associated with the object to store data about the object, the dual mode tag including a case, a UHF tag inside the case and structured to store a first portion of the data, and an HF tag inside the case and structured to store a second portion of the data. The system further includes a UHF reader structured to communicate with the UHF tag and recover the first portion of the data from the UHF tag, an HF reader structured to communicate with the HF tag and recover the second portion of the data from the HF tag, and a remote management system having a memory and a communication system that is communicatively coupleable to the HF reader and the UHF reader to receive a communication signal from both of the HF reader and the UHF reader and to store and modify the first portion of data and the second portion of data about the object in the remote management system, the remote management system structured to determine an authorization of a user of the HF reader and to transmit the first portion and the second portion of data about the object to one or both of the UHF reader and the HF tag reader in response to determining the authorization of the HF reader user.

In accordance with another aspect of the foregoing implementation, the remote management system is capable of communicating with the UHF tag via the UHF reader to use at least the second portion of the data received from the HF tag to modify at least the first portion of the data on the UHF tag after determining the authorization of the HF reader user.

In accordance with yet another aspect of the foregoing system, the HF reader includes executable instructions that enable the HF reader, upon reading the HF tag, to send at least the second portion of the data and any other information about the object and information about the HF tag to the remote management system after the remote management system determines an authorization of a user of the HF reader.

In accordance with a further aspect of the foregoing system, the remote management system is structured to communicatively link the HF tag to the UHF tag via one or more of the remote database, the HF reader, and the UHF reader after determining the authorization of the HF reader user.

In accordance with still yet another aspect of the system, the first portion of the data on the UHF tag and the second portion of the data on the HF tag are identical so that access to the HF tag via the HF reader provides access to the first portion of the data on the UHF tag after determining an authorization of a user of the HF reader.

In accordance with another aspect of the system, the system includes a website containing a copy of data stored on the UHF tag, and the HF tag is structured to store executable instructions or an address that can connect the HF reader, upon being authorized, to the website containing a copy of the data stored on the UHF tag.

In accordance with yet another aspect of the system, the first portion of the data on the UHF tag is fully different from the second portion of the data on the HF tag, and at least the second portion of the data on the HF tag provides the same information about the object that is associated with the first portion of the data on the UHF tag.

In accordance with one aspect of the present disclosure, a dual-mode RFID tag for storing data about objects and communicating with remote databases and communication systems is provided. In accordance with one aspect of the present disclosure, the dual mode RFID tag is physically associated with an object, and the dual mode RFID tag includes a case, a UHF tag stored inside the case, the UHF tag storing first information about the object, and an HF tag stored inside the case, the HF tag storing second information about the object, wherein the HF tag is not communicatively coupled to the UHF tag.

In accordance with another aspect of the present disclosure, the UHF tag and the HF tag are beam powered. Alternatively the UHF tag and the HF tag receive power from a common power source stored in the case, or the HF tag and the UHF tag each receive power from individual power sources stored in the case.

In accordance with yet another aspect of the present disclosure, a system to enable storing, monitoring, and recovering data regarding an object is provided. The system includes a dual mode tag associated with the object to store data about the object, the dual mode tag having a case, a UHF tag inside the case and structured to store at least a first portion of the data, and an HF tag inside the case and structured to store at least a second portion of the data. The system further includes a UHF reader to communicate with the UHF tag and recover at least the first portion of the data from the UHF tag, an HF reader to recover at least the second portion of the data from the HF tag, and a remote management system having a memory and a communication system that is communicatively coupleable to one or both of the HF reader and the UHF reader to receive a communication signal from one or both of the HF reader and the UHF tag and to store and modify data about the object in the remote management system, and to transmit data about the object to one or both of the UHF tag and the HF tag after determining the authorization of the HF reader user.

In accordance with a further aspect of the present disclosure, the management system is capable of communicating with the UHF tag via the UHF reader to use at least the second portion of the data received from the HF tag to modify or add to at least the first portion of the data on the UHF tag.

In accordance with still yet another aspect of the present disclosure, the HF reader includes executable instructions that enable the HF reader to send at least the second portion of the data and any other information about the object and information about the HF tag to the remote management system after determining the authorization of the HF reader user.

In accordance with a further aspect of the system of the present disclosure, the UHF tag and the HF tag are beam powered, or the UHF tag and the HF tag receive power from at least one common power source stored in the case, or the HF tag and the UHF tag each receive power from individual power sources stored in the case.

In accordance with yet a further aspect of the system of the present disclosure, the remote management system is structured to communicatively link the HF tag to the UHF tag via the HF reader or the UHF reader.

In accordance with still yet another aspect of the system of the present disclosure, at least the first portion of the data on the UHF tag and at least the second portion of the data on the HF tag are identical so that access to the HF tag via the HF reader after determining the authorization of the HF reader user, provides access information to at least the first portion of the data on the UHF tag.

In accordance with another aspect of the system of the present disclosure, the system includes a website containing a copy of data stored on the UHF tag, and the HF tag is structured to store executable instructions or an address that can connect the HF reader to the website containing a copy of the data stored on the UHF tag after determining the authorization of the HF reader user.

In accordance with a further aspect of the system of the present disclosure, at least the first portion of the data on the UHF tag is fully different from at least the second portion of the data on the HF tag, and at least the second portion of the data on the HF tag provides the same information about the object that is associated with at least the first portion of the data on the UHF tag.

BRIEF DESCRIPTION OF THE SEVERAL VIEWS OF THE DRAWINGS

The foregoing features and advantages of the present disclosure will be more readily appreciated as the same become better understood from the following detailed description when taken in conjunction with the accompanying drawings, wherein.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures or components or both associated with containers, UHF readers, charging stations, and radio frequency transponders have not been shown or described in order to avoid unnecessarily obscuring descriptions of the implementations.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation. Furthermore, the particular features, structures, or characteristics may be combined in any suitable manner in one or more implementations, and in which like reference characters designate the same or similar parts throughout the several views.

INTRODUCTION

The present disclosure is directed to systems and methods that utilize a dual mode tag that is actually two unique tags, one HF, such as in the 13.56 MHz band, and one UHF, such as in the 915 MHz band, inside the same housing or package. The system enables authorized personnel to read tags locally without the need to use a stationary reader or to carry a large and expensive hand held reader. The system facilitates the use of a portable device, such as a cell phone, equipped with a near field reader that locally reads the HF tags' information to link with the data that is on the original UHF tag.

For example, an employee might be interested in the identification of a particular object; however the employee may not have access to an expensive, bulky, and large UHF reader. With the system of the present disclosure, the employee can use a portable personal device, such as a cell phone, to read the HF tag that is part of a dual mode tag on the object. The cell phone, either locally or through the internet, reads the HF tag and after authorization of the user is complete, displays to the employee the identification of the tagged item and additional information about the item to which it is attached.

The system and method of the present disclosure will be described in the context of rail cars, but it will be understood that it can be implemented in other areas of commerce, as well as in education, science, and research.

These dual mode tags can be used on rail cars, locomotives and on rail ties.

As an example in the rail industry, a rail employee looks at a rail car and does not know to which train it is to be attached. He uses his cell phone to read the near field tag on the rail car to determine this is indeed a wagon of wheat to be sent to China and should be on track 9. Additionally, he notes that the rail car has recently been covered in graffiti and uploads a picture to the same database.

Representative Implementation

Figure 1:
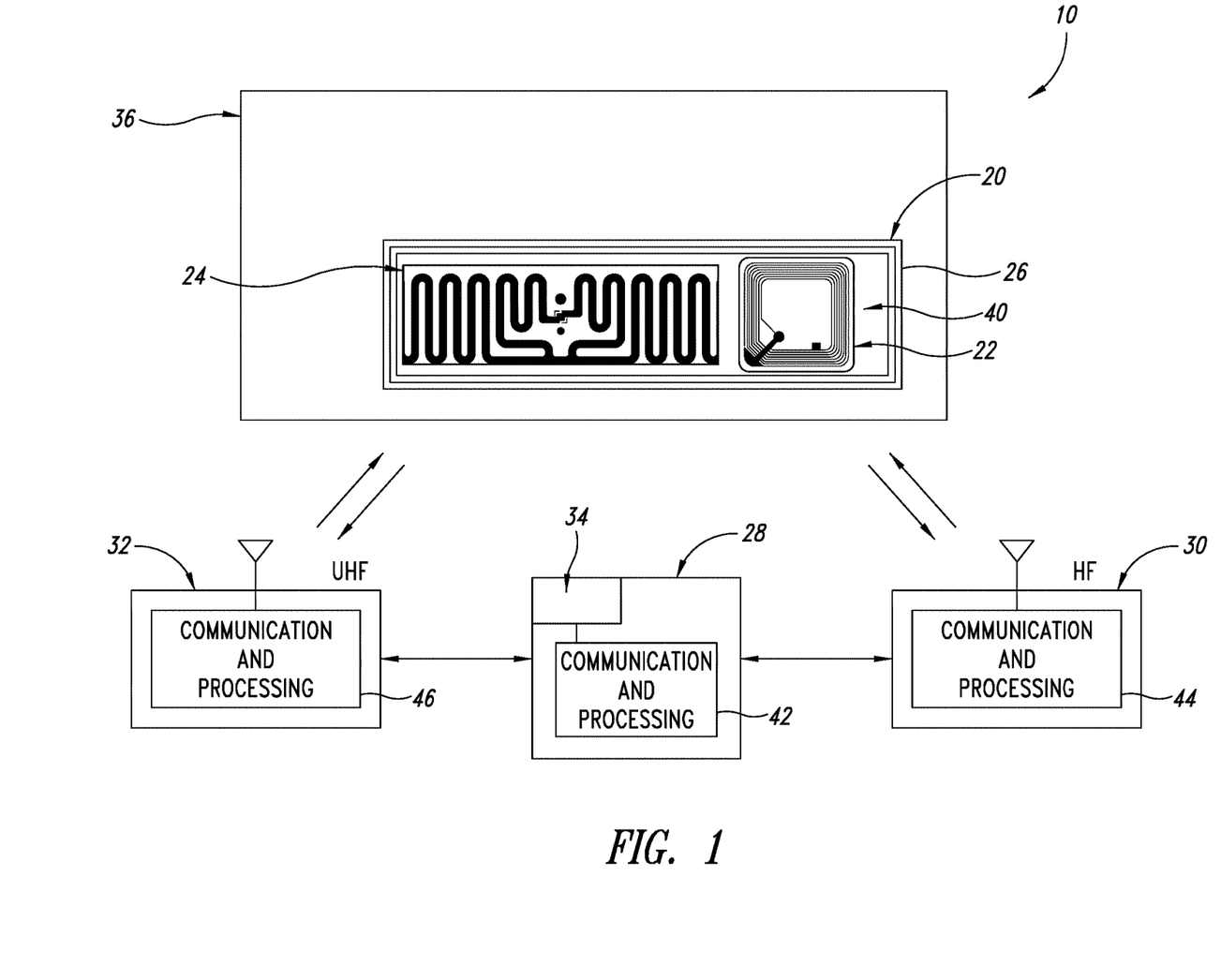
FIG. 1 is a block diagram of a representative implementation of a system employing a dual mode radio frequency identification transponder or tag formed in accordance with the present disclosure.

FIG. 1 is a block diagram of a dual mode RFID system 10 according to one representative implementation of the present disclosure. The system 10 includes a dual mode RFID tag 20 having an HF tag 22 and a UHF tag 24 inside a case 26. The HF tag 22 and the UHF tag 24 are communicatively coupleable to a remote management system 28 via an HF reader 30 and a UHF reader 32, respectively. The remote management system 28, in one embodiment, includes a memory 34 that can store data about an object 36 to which the dual mode RFID tag 20 is associated, such as by physical attachment of the dual mode RFID tag 20 to the object 36.

In the representative implementation illustrated and described herein, the object 36 is a rail car that can carry cargo or passengers or both. The rail car 36 can be a single rail car or multiple rail cars, either individually or coupled together to form a train of rail cars. The rail car can be an engine or locomotive, a caboose, maintenance vehicle, or other vehicle used in the rail industry. It will be understood that the present disclosure can be utilized to provide information and data about other objects, movable or stationary.

The RFID tag 20 with embedded HF tag 22 and UHF tag 24 are illustrated and described as radio-frequency identifier tags that can be affixed to objects individually or in combination, as disclosed herein. As disclosed more fully herein, these tags are used within the system 10 to store and passively or actively transmit data, such as information about the object itself as well as the object's location, condition, environment, contents, and history, and to track the movement of the object via interrogation of the dual mode tag 20 by one or more of the HF reader 30 and UHF reader 32 or at any one of several antennas from a same reader that utilizes both HF and UHF reader circuits.

In the system 10 the dual mode tag 20 utilizes a common case 26 to house both the HF tag 22 and the UHF tag 24. As shown more clearly in FIGS. 2 and 3, the case is preferably formed of a water resistant or water repellant material, such as polycarbonate. The case 26 includes an exterior wall 38 that encloses an interior 40 in which the tags 22, 24 are mounted. The interior 40 can be a single unitary space or it may be formed to have compartments for each of the tags 22, 24.

Figure 2:
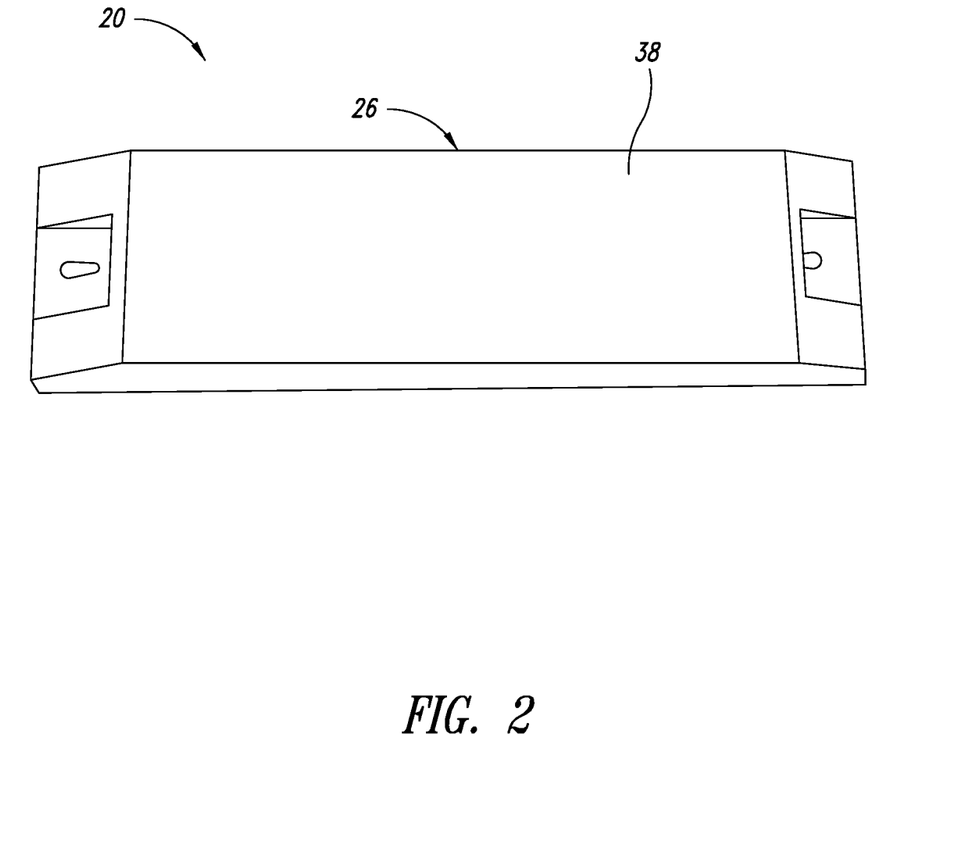
FIG. 2 is an illustration of the exterior of a case for the dual-mode tag formed in accordance with the present disclosure.
Figure 3:
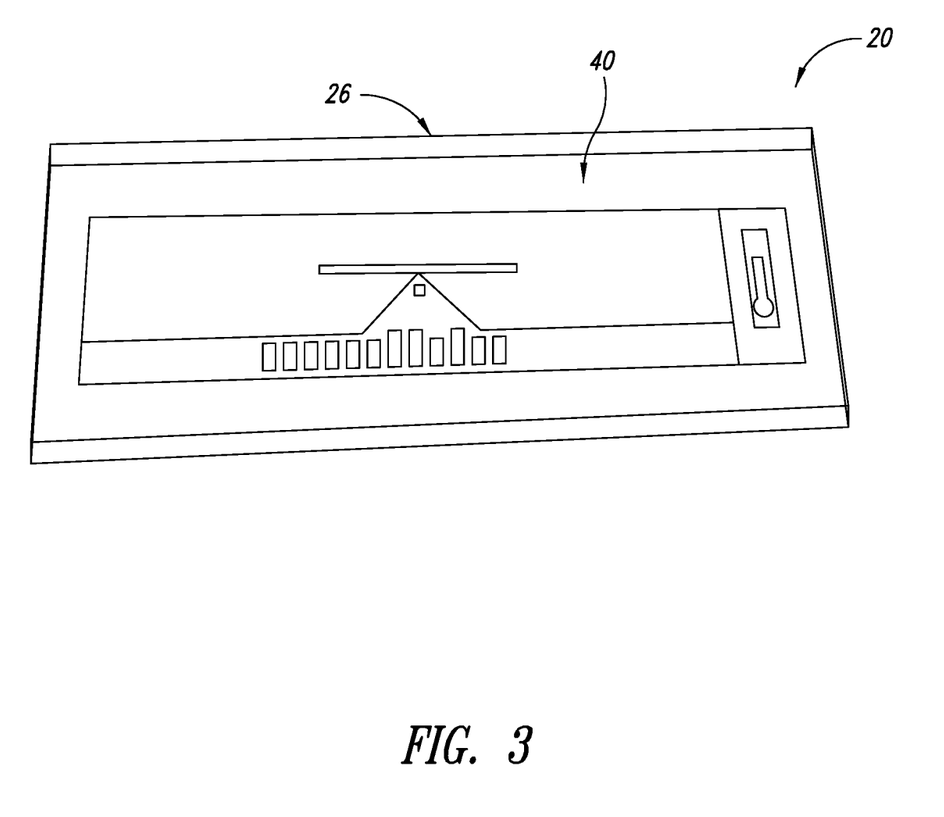
FIG. 3 is an illustration of an interior of the case of FIG. 2 showing the placement of a UHF tag and an HF tag in the case.

In one implementation the tags 22, 24 are physically, electrically, and communicatively isolated from one another inside the case 26, for example, within individual compartments in the case 26. The tags 22, 24, may also be stored in individual storage containers that are placed inside the interior 40 of the case 26. The tags or their storage containers may be attached to or held inside the case 26 using fasteners, adhesive, magnets, tape, plastic mounting lugs or other known attachment devices. Alternatively, the tags may be held inside the case by commercially available material in the interior 40 that absorbs moisture as well as cushions each of the tags 22, 24, and holds them in place by pressure, such as sandwiching the tags between one or more layers of the material. The cushioning, absorbing, and retaining layer(s) of the material may be placed on one, two, or all sides of the interior 40 of the container. Because the weight of the two tags is negligible, the tags 22, 24 can be sealed in the interior 40 of the case 26 without physically attaching them to the case 26.

The case may include an optional antenna for one or both of the tags, which can be mounted in the interior 40 or on an exterior of the case 26. Suitable conductors will connect the optional antenna to the respective tag 22, 24.

The means of attaching the case 26 to the object 36 can include any known fastener, adhesive, magnets, envelope, sleeve, or other means of fastening or holding the case 26 to the object 36. The case 26 may be mounted on the exterior or interior of the object 36, depending on the best location for wireless communication with the tag 20.

Each of the tags 22, 24 is a conventional HF tag 22 or UHF tag 24 that is readily commercially available and will not be discussed in detail herein. One or both of the tags 22, 24 may be a passive tag, meaning it is powered by the energy in the signal that it is designed to receive. Alternatively, one or both of the tags may be semi-active or fully active, meaning it is powered in part or completely by a separate source of energy, such as a battery. Solar energy converted to electricity may be used as alternative source, or a combination of solar energy that is converted to electricity and electrical energy in the onboard battery discussed above may be used. Solar energy may also be used to charge the battery or batteries when they are used.

Turning next to the remote management system 28, a communication and processing module 42 is provided that is capable of communicating with each of the HF reader 30 and UHF reader 32 via direct wireless communication, through an internet or other computer network connection, or a direct wired connection. The memory associated with the remote management system 28 is coupled to the communication and processing module to store data, such as information about the object 36. This data can include one or more of data stored on the UHF tag 22 via either the UHF reader 32 or the HF reader 30, data on the HF tag via the HF reader, or data to be stored on one or both of the HF tag 22 and the UHF tag 24 via HF reader 30 and the UHF reader 32, respectively, and as described further herein. The data is received from and transmitted via the communications and processing module 42 in a conventional manner.

The HF reader 30 includes a communication and processing module 44 with an onboard memory through which the data passes to and from the HF tag 22 and the remote management system 28. Similarly, the UHF reader 32 includes a communication and processing module 46 with an onboard memory through which data passes to and from the UHF tag 24 and the remote management system 28.

During operations the data received from the near field HF reader 30 can be used, in whole or in part, by the remote management system 28 to add to, modify, or reduce the data stored on the UHF tag 24. More particularly, the remote management system 28 is capable of communicating with the UHF tag 24 via the UHF reader 32 to use at least a portion of data received from the HF tag 22 to modify or add to the at least a portion of the data on the UHF tag 24.

In accordance with an aspect of the present disclosure, the HF reader includes executable instructions stored on the communication and processing module 44 that enables the HF reader 30 to read the HF tag 22 and send at least a portion of the data on the HF tag 22 and any other information about the object and information about the HF tag to the remote management system 28.

In accordance with yet another aspect of the system 10, the remote management system 28 includes authorization information to enable determination of whether a user of the HF reader 30 is an authorized user in response to authorization information input into the HF reader 30 by the user. This authorization information can take the form of a one or more of a password, user ID, fingerprint, retina scan or other biometrics, employee number, login information associated with the user and a particular HF reader, phone number, and other known authorization information, which includes authorization techniques.

In accordance with yet a further aspect of the system 10, the remote management system 28 is structured to communicatively link the HF tag 22 to the UHF tag 24 via the HF reader 30 or the UHF reader 32 or both.

In accordance with still yet another aspect of the system of the present disclosure, a first portion of the data about the object on the UHF tag 24 and at least a second portion of the data about the object on the HF tag 22 are identical so that access to the HF tag 22 via the HF reader 30 provides access information to at least the first portion of the data stored on the UHF tag 24.

In accordance with another aspect of the system 10, a remote database or website containing a copy of data stored on the UHF tag 24 and the HF tag 22, or the UHF tag 24, or both, is structured to store executable instructions or an address that can connect the HF reader 30 or the UHF reader 32 or both to the database or the website containing a copy of the data about the object stored on the UHF tag 24.

In accordance with a further aspect of the system of the present disclosure, at least a first portion of the data on the UHF tag 24 is fully different from at least a second portion of the data about the object on the HF tag 22, and at least the second portion of the data on the HF tag 22 provides the same information about the object that is associated with at least the first portion of the data on the UHF tag 24.

In operation, a rail employee in the rail industry observes a rail car and does not know to which train it is to be attached. The employee uses an HF reader 30 on his cell phone to read the near field HF tag 22 on the rail car 36 to determine this is indeed a wagon of wheat to be sent to Chicago and should be on track 9. Additionally, he notes that the rail car has recently been covered in graffiti and uploads a picture to the same database, as well as the GPS location information provided by his phone to the database or website discussed above.

FIG. 2 is an illustration of the exterior 38 of the case 26, and FIG. 3 is an illustration of the interior 40 of the case of FIG. 2 showing the placement of the HF tag 22 and a UHF tag 24 in the case 26 as described above.

Any and all headings are for convenience only and have no limiting effect. Unless otherwise defined, all technical and scientific terms used herein have the same meaning as commonly understood by one of ordinary skill in the art to which this disclosure belongs. Although specific terms are employed herein, they are used in a generic and descriptive sense only and not for purposes of limitation. All publications, patent applications, patents, and other references mentioned herein are incorporated by reference in their entirety to the extent allowed by applicable law and regulations.

The data structures and code described in this detailed description are typically stored on a computer readable storage medium, which may be any device or medium that can store code and/or data for use by a computer system.

This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

The present disclosure may be utilized upon any telecommunications network capable of transmitting data including voice data and other types of electronic data. Examples of suitable telecommunications networks for the present disclosure include but are not limited to global computer networks (e.g., Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). The present disclosure may communicate via a single telecommunications network or multiple telecommunications networks concurrently. Various protocols may be utilized by the electronic devices for communications such as but not limited to HTTP, SMTP, FTP and WAP (wireless Application Protocol). The present disclosure may be implemented upon various wireless networks such as but not limited to 3G, 4G, 5G, LTE, CDPD, CDMA, GSM, PDC, PHS, TDMA, FLEX, REFLEX, IDEN, TETRA, DECT, DATATAC, and MOBITEX. The present disclosure may also be utilized with online services and Internet service providers.

The Internet is an exemplary telecommunications network for the present disclosure. The Internet is comprised of a global computer network having a plurality of computer systems around the world that are in communication with one another. Via the Internet, the computer systems are able to transmit various types of data between one another. The communications between the computer systems may be accomplished via various methods such as but not limited to wireless, Ethernet, cable, direct connection, telephone lines, and satellite.

A central communication unit may be comprised of any communication site where communications are preferably established. The central communication units may be comprised of a server computer, cloud based computer, virtual computer, home computer or other computer system capable of receiving and transmitting data via IP networks and the telecommunication networks. As can be appreciated, a modem or other communication device may be required between each of the central communication units and the corresponding telecommunication networks. The central communication unit may be comprised of any electronic system capable of receiving and transmitting information (e.g., voice data, computer data, etc.). The disclosure is described above with reference to block and flow diagrams of systems, methods, apparatuses, and/or computer flow diagrams according to example implementations of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosure. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosure may provide for a computer program product, comprising a computer usable medium having a computer-readable program code or program instructions embodied therein, said computer-readable program code adapted to be executed to implement one or more functions specified in the flow diagram block or blocks.

The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present disclosure may be embodied in other specific forms without departing from the spirit or essential attributes thereof, and it is therefore desired that the present implementation be considered in all respects as illustrative and not restrictive. Many modifications and other implementations of the disclosure will come to mind to one skilled in the art to which this disclosure pertains and having the benefit of the teachings presented in the foregoing description and the associated drawings.

Therefore, it is to be understood that the disclosure is not to be limited to the specific implementations disclosed and that modifications and other implementations are intended to be included within the scope of the appended claims. Although methods and materials similar to or equivalent to those described herein can be used in the practice or testing of the present disclosure, suitable methods and materials are described above. Thus, the present disclosure is not intended to be limited to the implementations shown, but is to be accorded the widest scope consistent with the principles and features disclosed herein.

The various implementations described above can be combined to provide further implementations. Aspects of the implementations can be modified, if necessary to employ concepts of the various patents, applications and publications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A dual mode beam powered RFID tag physically associated with a vehicle or rail car, the dual mode RFID tag structured for use with an HF reader, the Dual mode beam powered RFID tag comprising:
   a case;
   a UHF tag stored inside the case, the UHF tag structured to store first information about the rail car or vehicle; and
   an HF tag stored inside the case, the HF tag structured to store second information about the UHF tag data, wherein the HF tag is not communicatively coupled to the UHF tag, the HF tag is structured to store data that is encrypted to require the HF reader user to contact another database to decode that information, and only after the other database determines the authorization of the HF reader user.

2. A system to enable storing, monitoring, modifying, and recovering data regarding an object, the system comprising:
   a beam powered dual mode tag associated with the object to store data about the object, the dual mode tag comprising:
      a case;
      a UHF tag inside the case and structured to store a first portion of the data; and
      an HF tag inside the case and structured to store a second portion of the data;
   a UHF reader structured to communicate with the UHF tag and recover the first portion of the data from the UHF tag;

an HF reader structured to communicate with the HF tag and recover the second portion of the data from the HF tag; and a remote management system having a memory and a communication system that is communicatively coupleable to the HF reader and the UHF reader to receive a communication signal from both of the HF reader and the UHF reader and to store and modify the first portion of data and the second portion of data about the object in the remote management system, the remote management system structured to determine an authorization of a user of the HF reader and to transmit the first portion and the second portion of data about the object to one or both of the UHF reader and the HF tag reader in response to determining the authorization of the HF reader user.

3. The system of claim 2 wherein the remote management system is capable of communicating with the UHF tag via the UHF reader to use at least the second portion of the data received from the HF tag to modify at least the first portion of the data on the UHF tag after determining the authorization of the HF reader user.

4. The system of claim 2, wherein the HF reader includes executable instructions that enable the HF reader, upon reading the HF tag, to send at least the second portion of the data and any other information about the object and information about the HF tag to the remote management system after the remote management system determines an authorization of a user of the HF reader.

5. The system of claim 2 wherein the remote management system is structured to communicatively link the HF tag to the UHF tag via one or more of the remote database, the HF reader, and the UHF reader after determining the authorization of the HF reader user.

6. The system of claim 2 wherein the first portion of the data on the UHF tag and the second portion of the data on the HF tag are identical so that access to the HF tag via the HF reader provides access to the first portion of the data on the UHF tag after determining an authorization of a user of the HF reader.

7. The system of claim 2 wherein the system includes a website containing a copy of data stored on the UHF tag, and the HF tag is structured to store executable instructions or an address that can connect the HF reader, upon being authorized, to the website containing a copy of the data stored on the UHF tag.

8. The system of claim 2 wherein the first portion of the data on the UHF tag is fully different from the second portion of the data on the HF tag, and at least the second portion of the data on the HF tag provides the same information about the object that is associated with the first portion of the data on the UHF tag.

* * * * *